May 30, 1961     H. TRIMBORN     2,986,386
TRANSPORT ROLLER FOR INDUSTRIAL FURNACES
Filed May 22, 1957     3 Sheets-Sheet 1
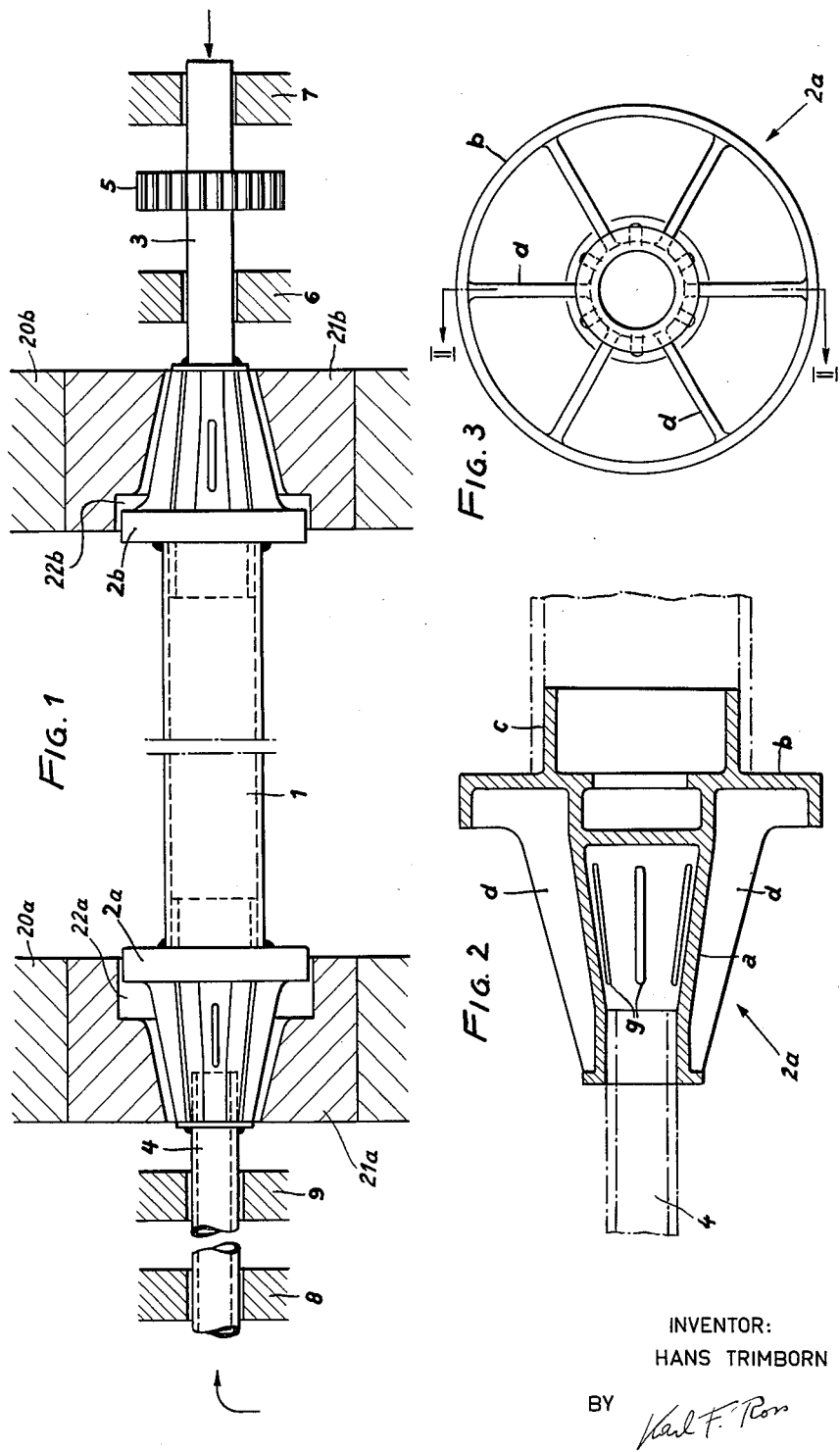
INVENTOR:
HANS TRIMBORN
BY Karl F. Ross
AGENT

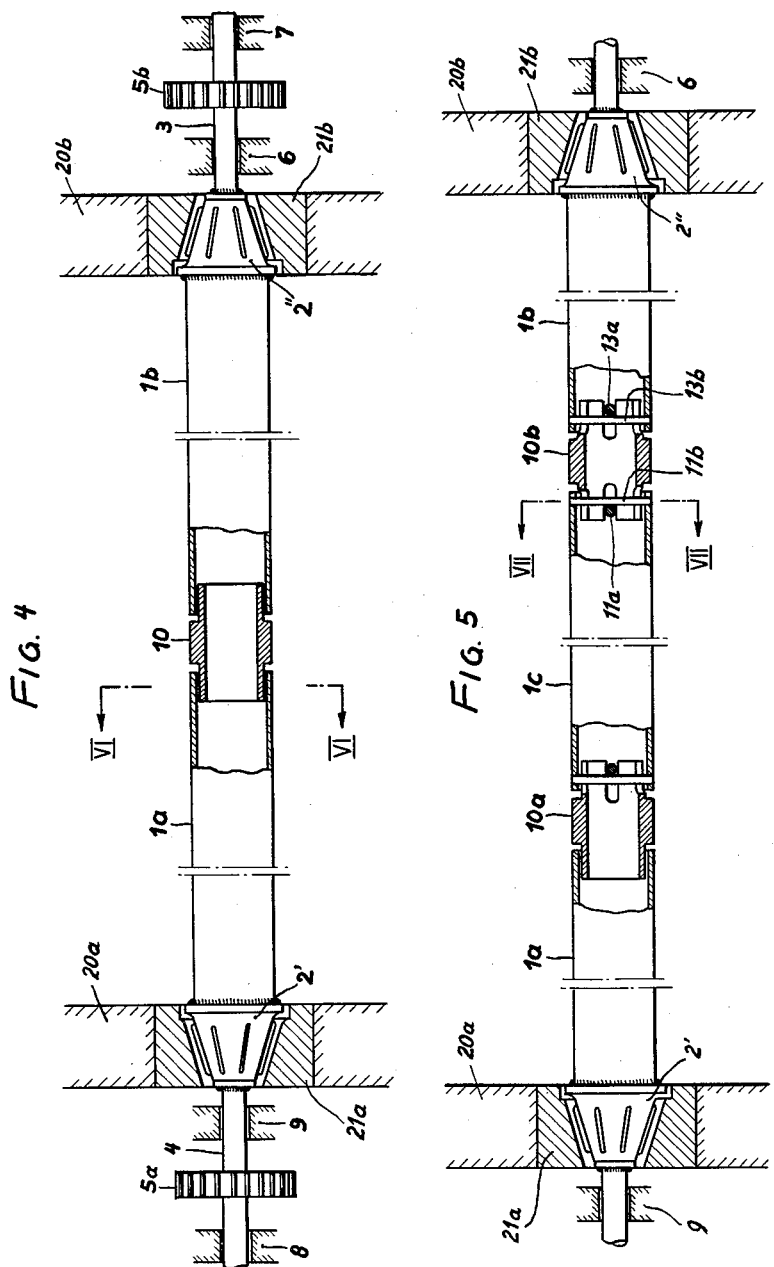

United States Patent Office 2,986,386
Patented May 30, 1961

2,986,386
TRANSPORT ROLLER FOR INDUSTRIAL FURNACES
Hans Trimborn, Koln, Germany, assignor to Schmidt & Clemens, Koln, Germany, a German firm
Filed May 22, 1957, Ser. No. 660,918
2 Claims. (Cl. 263—6)

The present invention relates to rollers as used in the interior of industrial furnaces for the transportation of white-hot steel bars and other objects maintained at high temperatures.

In the mounting of any elongated body, such as a roller, for rotation about its axis it has been standard practice to provide a single bearing at each extremity of the body in order to have a statically determinate system comparable to a simple beam. Were such body constrained at both ends, as by the addition of an extra bearing to form the equivalent of a double cantilever beam, a statically indeterminate system would result wherein a rigid roller could not be rotated without setting up undue centrifugal stresses tending to destroy the bearings or to rip them from their moorings.

This mode of mounting has, on the other hand, been found unsatisfactory for the transport rollers of industrial furnaces which, in operation, are subject to strong thermal and mechanical stresses adapted to cause their deformation. To allow for a certain amount of thermal expansion it has, therefore, been proposed to mount a tubular roller loosely at each end on a driven trunnion traversed by a cooling fluid, the entrainment of the roller by the trunnions being accomplished by loose coupling with the aid of suitable dogs or the like. A drawback of this arrangement, apart from its limited mechanical stability which restricts its load-bearing capacity, is the fact that the loose contact between the roller and its trunnions impedes the heat exchange therebetween, hence the necessity for using a highly heat-resistant body of great wall thickness, thus of considerable weight, for the tubular roller.

An object of the present invention is to provide an improved roller construction for the purpose set forth wherein the above-indicated disadvantages are avoided.

Another object of this invention is to provide means for effectively cooling and rotatably supporting a transport roller of an industrial furnace in such manner as to afford maximum load-bearing capacity along with dependable operation.

It has been found, in accordance with this invention, that a transport roller operating in the heated interior of an industrial furnace no longer behaves as a completely rigid body and that, accordingly, it becomes feasible to mount such roller in double-cantilever fashion, i.e. with each end thereof constrained by means of a pair of axially spaced-apart bearings. According to a more specific feature of the invention, the constrained extremities of the roller are in the shape of trunnions rigidly joined (as by welding) to its central tubular body, each trunnion preferably forming a thermal radiator, such as a centrifugal blower, rotatably lodged in a ventilator housing inserted into the furnace wall or constituted by a portion of the latter. Where the central body is of considerable length, it may be subdivided into sections interconnected by preferably tubular joints enabling relative axial expansion of the adjacent sections; advantageously, especially where the number of sections is greater than two, the joints may take the form of universal or Cardan-type couplings adapted to transmit a torque to those sections which cannot be directly rotated from the driven trunnion or trunnions.

The invention will be described in greater detail with reference to the accompanying drawing in which:

Fig. 1 is a fragmentary sectional view of an industrial furnace, showing in side elevation a transport-roller assembly according to the invention;

Fig. 2 shows, on a larger scale, the left-hand trunnion of the assembly of Fig. 1, in axial section taken on the line II—II of Fig. 3;

Fig. 3 is an end-elevational view of the left-hand trunnion of Fig. 1, drawn to the same scale as in Fig. 2;

Fig. 4 is a view similar to Fig. 1 but showing a two-sectional transport roller according to the invention;

Fig. 5 is a view similar to Fig. 4, showing a three-sectional modification of the transport roller of Fig. 1;

Figure 6:
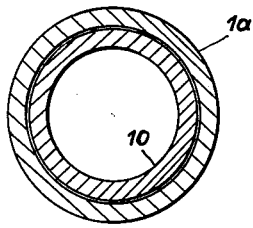
Fig. 6 is a sectional view of a joint forming part of the roller structure of Fig. 4, taken on the line VI—VI of that figure but drawn to a larger scale.

In Fig. 1 there are shown the walls 20a, 20b of an industrial furnace, spanned by the central tubular body 1 of a transport roller embodying the invention. Ventilator housings 21a, 21b, inserted in these walls, are suitably recessed at 22a, 22b to receive a pair of thermal radiators in the form of centrifugal blowers 2a, 2b which, together with respective hollow shafts 4 and 3 extending beyond the furnace walls, constitute a pair of trunnions rigid with the roller body 1. Although the members 1, 2a, 2b, 3 and 4 could be interconnected by any suitable means, they have been shown in the drawing as joined together by welding. Body 1 and the blower portions 2a, 2b of its trunnions are preferably made of a highly refractory material; shafts 3 and 4, located outside the heating chamber enclosed by the walls 20a, 20b, may be made of ordinary steel. It will be noted that the recesses 22a, 22b are of generally frustoconical configuration, diverging toward the heating chamber.

As best seen in Figs. 2 and 3 for the radiator 2a, each blower comprises a generally frustoconical rotor *a* provided at its inwardly facing base with a flanged disk *b* substantially sealing the recesses 22a, 22b against the interior of the furnace. A short collar *c* extends beyond disk *b* to enter the roller body 1, as indicated in dot-dash lines in Fig. 2. Shaft 4 enters the frustoconical blower rotor *a* at its small end, as likewise illustrated in dot-dash lines. Radial vanes *d* extend at regular angular intervals along the outer periphery of rotor member *a* and terminate at the disk *b*; between these vanes the member *a* is provided with axially oriented peripheral slots *g* through which, during rotation, the heated air from the interior of roller body 1 is automatically expelled into the recess 22a which opens into the surrounding atmosphere. Relatively cool ambient air, or some cooling fluid supplied under pressure, is drawn in through hollow shaft 4 (and, on the opposite end, through hollow shaft 3) as indicated by the arrow in Fig. 1. It will be understood that valves or the like may be provided for controlling, manually or automatically, the supply of such cooling fluid, e.g. in such manner as to admit the fluid in the event of a critical rise in temperature (e.g. when rotation of the roller is stopped).

Two axially spaced-apart bearings 6 and 7 support the shaft 3, shaft 4 being similarly supported by bearings 8 and 9. Rotation is imparted to the roller unit 1—4 via a gear 5 keyed onto shaft 3 between bearings 6 and 7. It will be appreciated that, with this constraining arrangement, the roller body 1 will be positively restored to its straight form whenever, in its white-hot condition, it is caused to sag by the weight of the load.

In Fig. 4 the single roller body 1 has been replaced by two tubular sections 1a, 1b respectively rigid with the trunnions 4, 2′ and 3, 2″. The sections are interconnected by a tubular link 10 which enables their relative axial displacement upon thermal expansion or contraction. Because the link 10 does not afford positive coupling between the two roller sections, separate driving gears 5a, 5b therefor have been shown keyed onto shafts 4 and 3 between bearings 8, 9 and 6, 7, respectively. A cross-sectional view of link 10 appears in Fig. 6. The thermal radiators 2′, 2″ differ from the blower members 2a, 2b of the preceding figures mainly in that their vanes do not extend over the full length of their rotors and that the slots g have been omitted.

Figure 7:
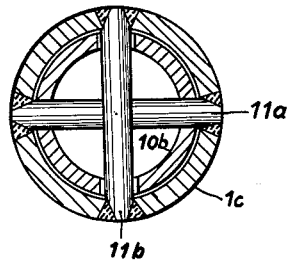
Fig. 7 is a sectional view of the right-hand joint of Fig. 5, taken on the line VII—VII of that figure but drawn to a larger scale.
Figure 8:
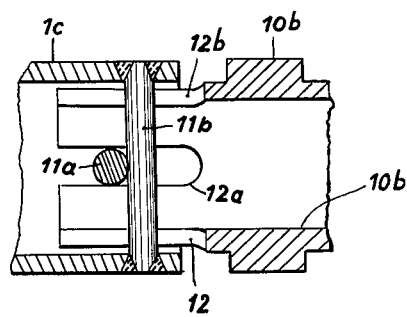
Fig. 8 is an enlarged fragmentary view, in axial section, of the joint shown in Fig. 7.

Figs. 5, 7 and 8 show a roller body consisting of two directly driven outer sections 1a, 1b, rigid with their respective trunnions as in Fig. 4, and of an intermediate section 1c joined to the former by links 10a and 10b, respectively. Roller section 1c is traversed at each end by two crossed pins 11a, 11b which enter respective peripheral slots in the adjacent links, such as the pairs of diametrically opposite, axially extending slots 12a, 12b formed in mutually perpendicular planes in link 10b (Fig. 8). Similar pins 13a, 13b are also provided on the roller section 1b which is thus positively coupled, through the intermediary of the universal joint constituted by link 10b, with roller section 1c. Since the link 10a has been shown to be similar at its left-hand end to the link 10 of Fig. 4, no rotative entrainment takes place between sections 1a and 1c, hence separate means must be provided for driving the two trunnions as has been illustrated in Fig. 4. It will be understood that, if desired, link 10 of Fig. 4 or link 10a of Fig. 5 may be replaced by a universal joint similar to link 10b, in which case a single gear or equivalent driving means may be provided for the entire roller structure.

The invention is, of course, not restricted to the specific embodiments described and illustrated but may be realized in various modifications thereof, including different combinations of features shown in the several views of the accompanying drawing. The ventilator housings 21a, 21b may be grooved or otherwise modified to improve the circulation of air around the rotors. The rotors 2′, 2″ of Figs. 4 and 5 may, if desired, also be provided with slots g (Fig. 2) between the vanes thereof which in the absence of such slots act mainly as cooling fins. The various parts of the rotatable unit may be joined together by press-fit or in some equivalent manner insuring good mechanical and thermal contact, rather than by welding as shown.

What is claimed is:

1. In an industrial furnace, in combination, a heating chamber having a side wall, a ventilator housing in said side wall, said housing being provided with a through-going, generally frusto-conical recess diverging toward said heating chamber, a rotatable tubular unit passing through said recess into said heating chamber, bearing means for said unit positioned externally of said heating chamber, said unit being open toward the atmosphere outside said chamber and including a thermal radiator received with clearance in said recess, said radiator being provided with a circular flange received in and substantially sealing the inner end of said recess against said heating chamber, the outer end of said recess communicating with the atmosphere, and drive means for rotating said unit, said radiator comprising a hollow rotor member with a generally frustoconical wall which is axially substantially coextensive with said recess and is terminated at its broad end by said flange, said rotor member being provided on the exterior of said frustoconical wall with radially projecting vanes angularly spaced around its periphery, said vanes extending from said flange outwardly from said chamber over substantially the entire axial length of said recess and having a radial height substantially greater than the thickness of said frustoconical wall, said rotor member being provided with axially extending peripheral slots between said vanes whereby the circulation produced by said vanes within said recesss upon rotation of said unit will centrifugally draw atmospheric air, through an external part of said unit, by way of said slots and will cause an outward flow of said air from said recess, said flow passing generally axially between said vanes.

2. In an industrial furnace, in combination, a heating chamber having a side wall, a ventilator housing in said side wall, said housing being provided with a through-going, generally frusto-conical recess diverging toward said heating chamber, a rotatable tubular unit passing through said recess into said heating chamber, bearing means for said unit positioned externally of said heating chamber, said unit including a thermal radiator received with clearance in said recess, said radiator being provided with a circular flange received in and substantially sealing the inner end of said recess against said heating chamber, the outer end of said recess communicating with the atmosphere, drive means for rotating said unit, said radiator comprising a hollow rotor member with a generally frustoconical wall which is axially substantially coextensive with said recess and is terminated at its broad end by said flange, said rotor member being provided on the exterior of said frustoconical wall with radially projecting vanes angularly spaced around its periphery, said vanes extending from said flange outwardly from said chamber over substantially the entire axial length of said recess and having a radial height substantially greater than the thickness of said frustoconical wall, said rotor member being provided with axially extending peripheral slots between said vanes, and means for introducing a cooling fluid through the interior of said unit and said slots into said recess, said cooling fluid being circulated in said recess by said vanes and passing outwardly into the atmosphere from said recess while flowing in generally axial direction between said vanes.

References Cited in the file of this patent

UNITED STATES PATENTS

| | | |
|---|---|---|
| 617,917 | Berg | Jan. 17, 1899 |
| 1,834,207 | Fahrenwald | Dec. 1, 1931 |
| 1,843,440 | Blythe | Feb. 2, 1932 |
| 1,850,617 | Brooke | Mar. 22, 1932 |
| 1,922,039 | Harris | Aug. 15, 1933 |
| 1,927,634 | Fahrenwald | Sept. 19, 1933 |
| 1,992,467 | Blythe | Feb. 26, 1935 |
| 2,059,794 | Jackson | Nov. 3, 1936 |
| 2,202,424 | Hough | May 28, 1940 |
| 2,788,957 | Lindquist | Apr. 16, 1957 |

FOREIGN PATENTS

| | | |
|---|---|---|
| 748,157 | Germany | Oct. 27, 1944 |